US011267087B2

(12) United States Patent
Thomas et al.

(10) Patent No.: US 11,267,087 B2
(45) Date of Patent: Mar. 8, 2022

(54) ROTATING MACHINE COUPLING HUB PULLING DEVICE

(71) Applicant: Saudi Arabian Oil Company, Dhahran (SA)

(72) Inventors: Nishan Xavier Chammany Thomas, Udhailiyah (SA); Moath A. Alhaykan, Mubarraz (SA)

(73) Assignee: Saudi Arabian Oil Company, Dhahran (SA)

( * ) Notice: Subject to any disclaimer, the term of this patent is extended or adjusted under 35 U.S.C. 154(b) by 170 days.

(21) Appl. No.: 16/717,847

(22) Filed: Dec. 17, 2019

(65) Prior Publication Data

US 2021/0178531 A1 Jun. 17, 2021

(51) Int. Cl.
| | | |
|---|---|---|
| *B23P 19/02* | (2006.01) | |
| *B66C 1/10* | (2006.01) | |
| *B66C 5/10* | (2006.01) | |
| *B25H 1/00* | (2006.01) | |
| *B25B 27/02* | (2006.01) | |

(52) U.S. Cl.
CPC .............. *B23P 19/025* (2013.01); *B66C 1/10* (2013.01)

(58) Field of Classification Search
CPC . B23P 19/025; B66C 1/10; B66C 5/10; B25H 1/0021; B25B 27/023
See application file for complete search history.

(56) References Cited

U.S. PATENT DOCUMENTS

| | | | | | |
|---|---|---|---|---|---|
| 2,764,806 | A | * | 10/1956 | Woodard | B66F 9/12 29/252 |
| 3,908,258 | A | * | 9/1975 | Barty | B25B 27/026 29/252 |
| 5,127,638 | A | * | 7/1992 | Kent | B62B 3/04 254/133 R |
| 5,895,030 | A | * | 4/1999 | Mohun | B60B 29/002 254/7 R |
| 6,092,279 | A | * | 7/2000 | Shoup | B25B 27/062 29/259 |
| 7,980,604 | B2 | * | 7/2011 | Punaro | B25B 27/062 292/258 |

(Continued)

FOREIGN PATENT DOCUMENTS

| | | |
|---|---|---|
| EP | 2392431 | 10/2019 |
| JP | H 0570872 | 9/1993 |
| JP | H0570872 U * | 9/1993 |

(Continued)

OTHER PUBLICATIONS

PCT International Search Report and Written Opinion in International Appln. No. PCT/US2020/065529, dated Apr. 20, 2021, 15 pages.

*Primary Examiner* — Bayan Salone
(74) *Attorney, Agent, or Firm* — Fish & Richardson P.C.

(57) ABSTRACT

An assembly for separating a coupling hub from a shaft of a rotating machine includes a support frame sub-assembly that structurally supports the assembly and the coupling hub. A vertical adjustment sub-assembly is structurally supported by the support frame sub-assembly. The vertical adjustment sub-assembly adjusts the elevation of a puller sub-assembly from the surface of the Earth. The puller sub-assembly couples to the coupling hub and separates the coupling hub from the shaft.

14 Claims, 9 Drawing Sheets

(56) References Cited

U.S. PATENT DOCUMENTS

| | | | |
|---|---|---|---|
| 8,464,411 B2* | 6/2013 | Betcher ................... | B66F 19/00 29/259 |
| 2011/0133139 A1* | 6/2011 | Betcher ................... | B66F 19/00 254/100 |

FOREIGN PATENT DOCUMENTS

| | | | |
|---|---|---|---|
| JP | 2014069302 | | 4/2014 |
| JP | 2014069302 A | * | 4/2014 |

* cited by examiner

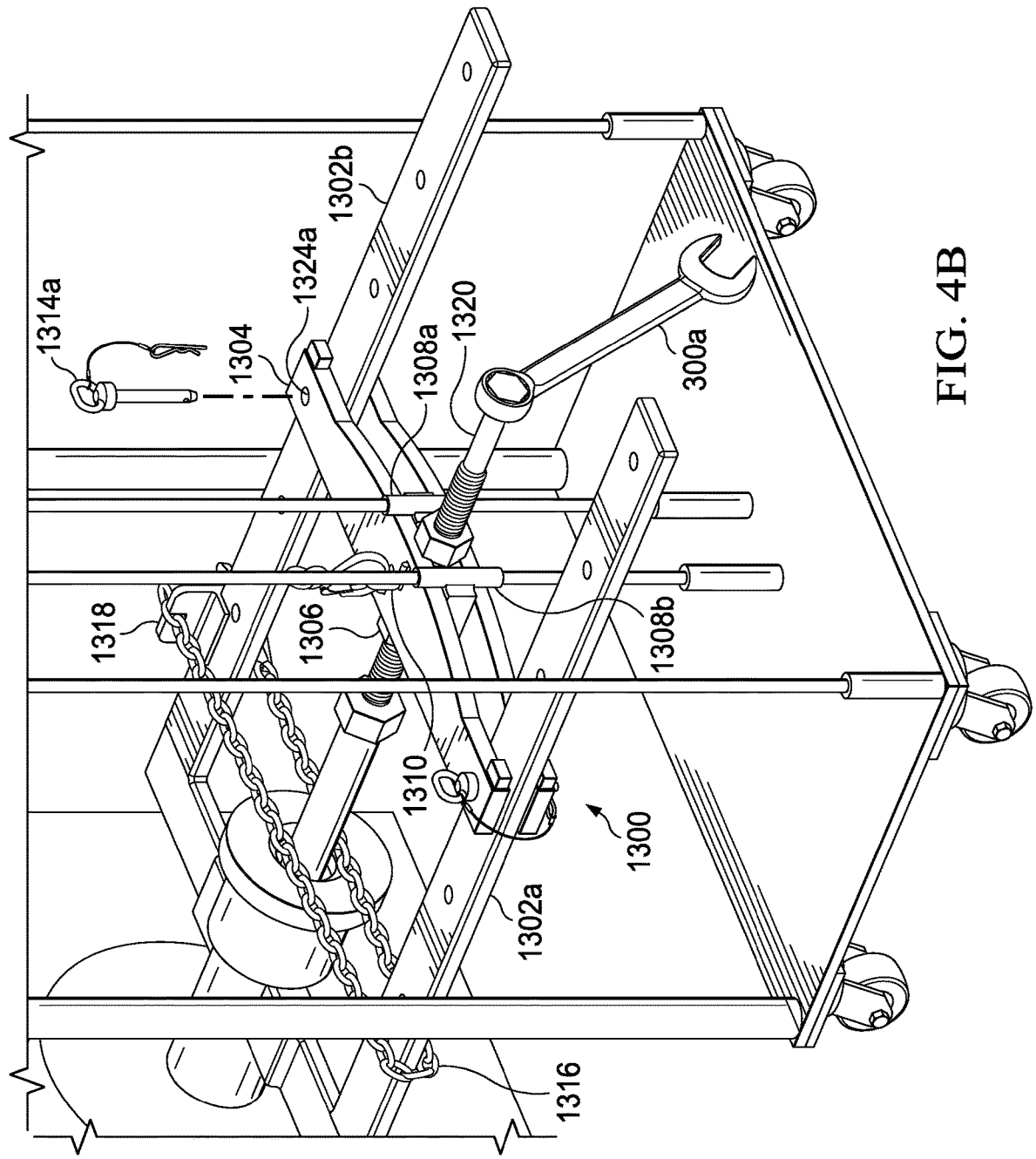

ROTATING MACHINE COUPLING HUB PULLING DEVICE

TECHNICAL FIELD

This disclosure relates to removing coupling hubs from a shaft of a rotating machine, for example, a motor, pump, compressor, generator or similar rotating machine.

BACKGROUND

Motors are used to convert electrical energy into mechanical energy. Pumps are used to move liquids or gases. Compressors are used to raise the pressure of a gas and to move the gas. A generator converts mechanical energy into electrical energy. Rotating machines of these types are used in many applications in the oil and gas industry such as drilling wells, completing wells, and producing wells. Coupling hubs attach to the shaft of a motor, pump, compressor, generator, or similar rotating machine. Coupling hubs are used to connect shafts for power transmission, torque transmission, and misalignment correction. The process of separating a coupling hub from a shaft of a rotating machine is called pulling the coupling hub. It can also be referred to as removing the coupling hub.

SUMMARY

This disclosure describes technologies related to a coupling hub pulling device.

Implementations of the present disclosure include a hub pulling assembly that separates a coupling hub from a shaft of a rotating machine. The assembly includes a support frame sub-assembly that structurally supports the assembly and the coupling hub. The support frame sub-assembly structurally supports a vertical adjustment sub-assembly. The vertical adjustment sub-assembly adjusts the elevation of a puller sub-assembly from the surface of the Earth. The puller sub-assembly couples to the coupling hub and separates the coupling hub from the shaft.

In some implementations, the puller sub-assembly includes puller arms. In this implementation, the first puller arm has a first puller arm coupling hub holding end configured to mechanically engage a coupling hub first side and a chain lock bracket. The second puller arm has a second puller arm coupling hub holding end mechanically arranged to engage a coupling hub second side. The first puller arm and the second puller arm engage the coupling hub on opposite sides. A puller bar mechanically couples the first puller arm, the second puller arm, and the vertical adjustment sub-assembly. The puller bar includes a screw adjustment body. The puller sub-assembly also includes a pusher stud configured to rotatably couple with the puller bar screw adjustment body, with a pusher stud first end configured to mechanically couple with the shaft attached to the coupling hub, and a pusher stud second end configured to accept a hand tool. The assembly also includes a chain mechanically coupled to the chain lock bracket that mechanically locks the first puller arm and the second puller arm to the coupling hub.

In some implementations, the puller sub-assembly moves the coupling hub along an axis of the shaft.

In some implementations, the vertical adjustment sub-assembly includes vertical adjustment bars that couple to the puller sub-assembly, allowing the puller sub-assembly to move along a vertical axis. A winch is mechanically coupled to the support frame sub-assembly and the puller sub-assembly that controls the movement of the puller sub-assembly in the vertical direction.

In some implementations, the support frame sub-assembly further includes a base plate to support the hub pulling assembly with vertical legs attached to the base plate. The top of some of vertical legs attach to a first frame member, while the top of other vertical legs attach to a second frame member. A center frame member couples with and perpendicular to the first frame member and the second frame member. The center frame member is configured to accept a winch.

In some implementations, the support frame sub-assembly further includes an angular support leg mechanically coupled to a front side of the support frame sub-assembly to prevent support frame movement to the front side.

In some implementations, the coupling hub pulling assembly further includes a coupling hub holding sub-assembly to hold the coupling hub once separated from the shaft. The coupling hub pulling assembly includes a chain hoist or a lever hoist mechanically coupled to the support frame sub-assembly and an eye bolt mechanically coupled to the coupling hub. The chain hoist or lever hoist is mechanically coupled to the eye bolt on the coupling hub.

Further implementations of the present disclosure include a method for separating a coupling hub from a shaft of a rotating machine. The method includes a support frame sub-assembly structurally supporting an assembly configured to separate a coupling hub from a shaft. A vertical adjustment sub-assembly mechanically coupled to the support frame adjusts a puller sub-assembly vertically relative to a surface of the Earth to align the puller sub-assembly relative to the coupling hub. Puller sub-assembly puller arms couple to the coupling hub and a puller sub-assembly pusher stud couples to the shaft. The puller sub-assembly separates the coupling hub from the shaft by an axial movement of the plurality of the puller arms along an axis of the shaft.

In some implementations, the removing of the coupling hub from the shaft by the puller sub-assembly further includes coupling a first puller arm coupling hub holding end to a coupling hub first side and coupling a second puller arm coupling hub holding end to a coupling hub second side. The coupling hub second side opposes the coupling hub first side. A chain locks around the first puller arm coupling hub holding end and the second puller arm coupling hub holding end. The pusher stud seats against the shaft. The pusher stud rotates, through the screw type adjustment device, by a hand tool causing the coupling hub to move along an axis of the shaft.

In some implementations, vertically adjusting the puller sub-assembly further includes operating a winch attached to the support frame sub-assembly to vertically adjust the puller sub-assembly.

In some implementations, an angular support leg mechanically coupled to a front side of the support frame sub-assembly further supports the coupling hub assembly.

In some implementations, a chain hoist or a lever hoist supports the coupling hub by attaching an eye bolt to the coupling hub, and the chain hoist or lever hoist to the eye bolt.

Further implementations of the present disclosure include a hub pulling assembly configured to separate a coupling hub coupled to a shaft of a rotating machine including a support frame sub-assembly configured to structurally support the assembly and the coupling hub. The support frame sub-assembly further includes multiple vertical legs, a first frame member coupled to a first subset of the vertical legs, a second frame member coupled to a second subset of the vertical legs, and a center frame member configured to accept a winch coupled perpendicular to the first frame member and the second frame member. A puller sub-assembly is configured to couple to the coupling hub and to separate the coupling hub from the shaft. The puller sub-assembly further includes a first puller arm comprising a first puller arm coupling hub holding end configured to mechanically engage the coupling hub first side; a second puller arm comprising a second puller arm coupling hub holding end mechanically arranged to engage a coupling hub second side; a puller bar mechanically coupled to the first puller arm, the second puller arm, and the vertical adjustment sub-assembly; a pusher stud mechanically coupled to the puller bar; and a puller arm lock. A vertical adjustment sub-assembly structurally supported by the support frame sub-assembly is mechanically coupled to the puller sub-assembly. The vertical adjustment sub-assembly is configured to vertically adjust the elevation of the puller sub-assembly from the surface of the Earth and constrain the puller sub-assembly to move in a vertical axis.

In some implementations, the puller sub-assembly of the hub pulling assembly is configured to cause the coupling hub to move along an axis of the shaft.

In some implementations, the support frame of the hub pulling assembly further includes an angular support leg mechanically coupled to a front side of the support frame sub-assembly to prevent support frame movement to the front side.

In some implementations, a coupling hub holding sub-assembly of the hub pulling assembly is configured to hold the coupling hub once separated from the shaft. The coupling hub holding sub-assembly includes a chain hoist or a lever hoist mechanically coupled to the support frame sub-assembly and an eye bolt mechanically coupled to the coupling hub. The chain hoist or lever hoist is mechanically coupled to the eye bolt.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 4b is a perspective view of the puller sub-assembly of the coupling hub pulling assembly of FIG. 1 with a hand tool engaged on the pusher stud.

DETAILED DESCRIPTION

Figure 1:
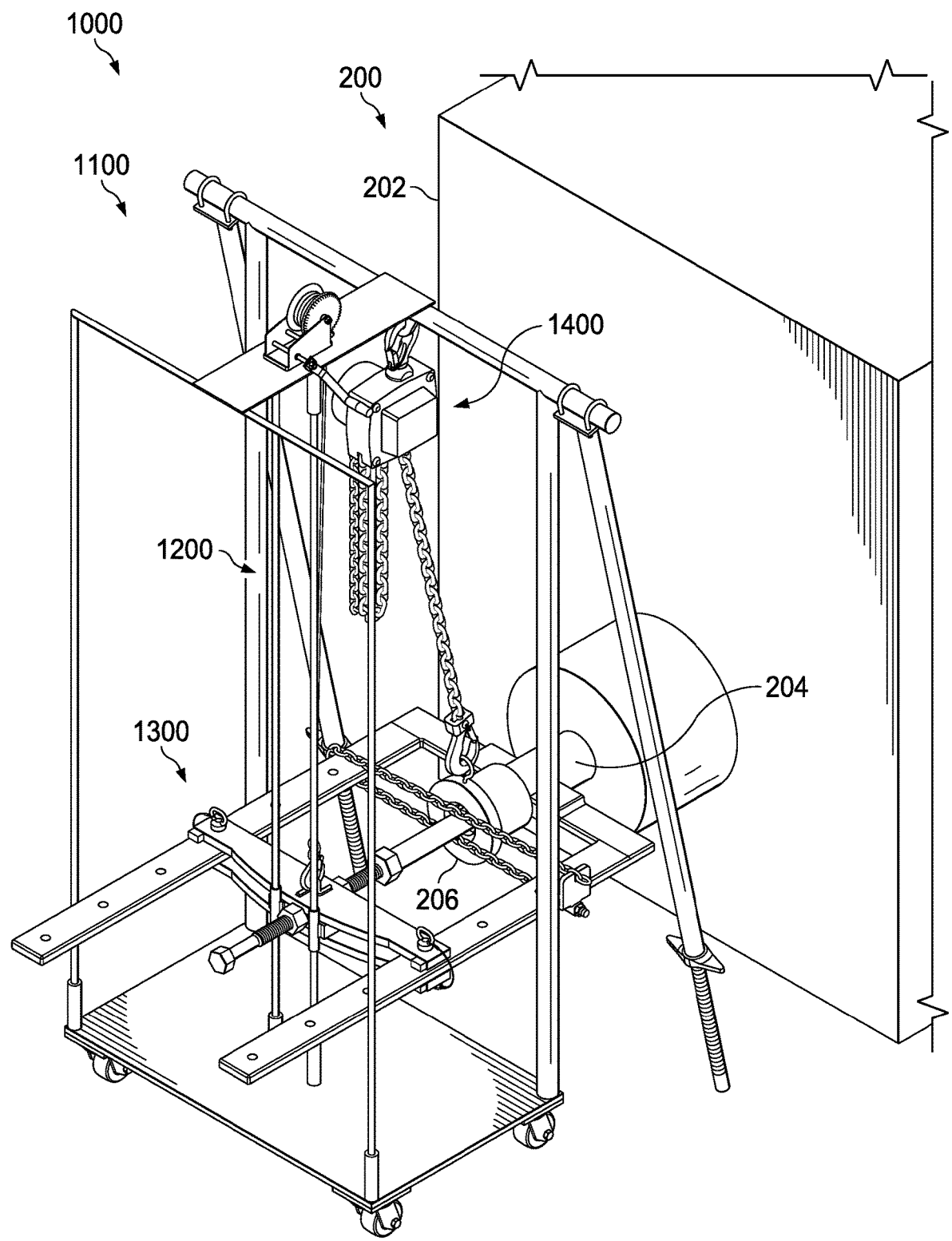
FIG. 1 is a perspective view of the coupling hub pulling assembly with the various sub-assemblies engaged with a coupling hub on a rotating machine shaft.

The present disclosure describes an assembly and a method for separating a coupling hub from a shaft of a rotating machine by pulling the coupling hub along an axis of the shaft toward the unconstrained end of the shaft away from the rotating machine. Motors, pumps, compressors, and generators are examples of rotating machines with shafts that can have a coupling hub installed on the shaft. Some rotating machines coupling hubs installed on their respective shafts transfer power and torque to other components. Other rotating machine coupling hubs installed on their respective shafts correct for misalignment between components. At times, the rotating machine is in need of repair requiring the coupling hub to the pulled from the shaft. At other times, different industrial equipment is needed to connect to the rotating machine, so a different size coupling hub is required, necessitating pulling the coupling hub from the shaft. The coupling hub pulling device is used to remove the coupling hub from the shaft of the rotating machine.

The coupling hub pulling assembly includes a puller sub-assembly, a vertical adjustment sub-assembly, and a support frame sub-assembly. The puller sub-assembly has puller arms that attach to the coupling hub and a pusher stud that attaches to the shaft of the rotating machine. Movement of the pusher stud in one direction and the puller arms in the opposite direction cause the coupling hub to move along the shaft. When the coupling hub reaches the termination end of the shaft, it is fully separated from the shaft. The vertical adjustment sub-assembly is attached support frame sub-assembly and moves the puller sub-assembly up and down in the vertical plane relative to the Earth to align the puller sub-assembly with the coupling hub and the shaft. A puller bar connects the puller arms and pusher stud. The puller arms and pusher stud apply force in opposing directions on the coupling hub and shaft, causing the coupling hub to move along an axis of the shaft. The coupling hub reaches the end of the shaft and is separated from the shaft. The support frame sub-assembly structurally supports the vertical adjustment sub-assembly and the puller sub-assembly.

Implementations of the present disclosure realize one or more of the following advantages. For example, the coupling hub pulling assembly can reduce the number of personnel required to remove the coupling hub from the shaft. Multiple personnel are no longer required to manually hold a coupling hub pulling sub-assembly, others to operate the hub pulling sub-assembly, and additional personnel to support the coupling hub once removed from the shaft. The required personnel are reduced from five or six to two or three. For example, the coupling hub pulling assembly can support and constrain movement of the coupling hub once it separates from the shaft, improving safety of the coupling hub separating operation. Pinch points in hub removal operations are reduced. For example, dropping an unconstrained coupling hub leads to damage of the coupling hub. The coupling hub constrained by the coupling hub holding sub-assembly prevents dropping of the coupling hub on personnel involved in coupling hub separation operations.

Referring to FIG. 1, an assembly 1000 for separating a coupling hub 206 from a shaft 204 of a rotating machine 202 is shown. The coupling hub pulling assembly 1000 includes a support frame sub-assembly 1100 coupled to a vertical adjustment sub-assembly 1200. The support frame sub-assembly 1100 structurally supports the vertical adjustment sub-assembly 1200. The vertical adjustment sub-assembly 1200 is coupled to the puller sub-assembly 1300. The vertical adjustment sub-assembly 1200 constrains the movement of the puller sub-assembly 1300 in a plane parallel to the surface of the Earth. The vertical adjustment sub-assembly 1200 moves the puller sub-assembly 1300 in a vertical axis perpendicular to the surface of the Earth to align the puller sub-assembly 1300 with the coupling hub 206 to be removed from the shaft 204. The puller sub-assembly 1300 applies forces in opposing directions on the coupling hub 206 and shaft 204, causing the coupling hub 206 to move along an axis of the shaft 204 away from the rotating machine 202 and off the shaft 204. The puller sub-assembly 1300 holds the coupling hub 206 in place when the coupling hub 206 is removed from the shaft 204. In some implementations, the coupling hub holding sub-assembly 1400 is coupled to support frame sub-assembly 1100 and allows the separated coupling hub 206 to be raised or lowered in the vertical direction relative to the Earth.

Figure 2:
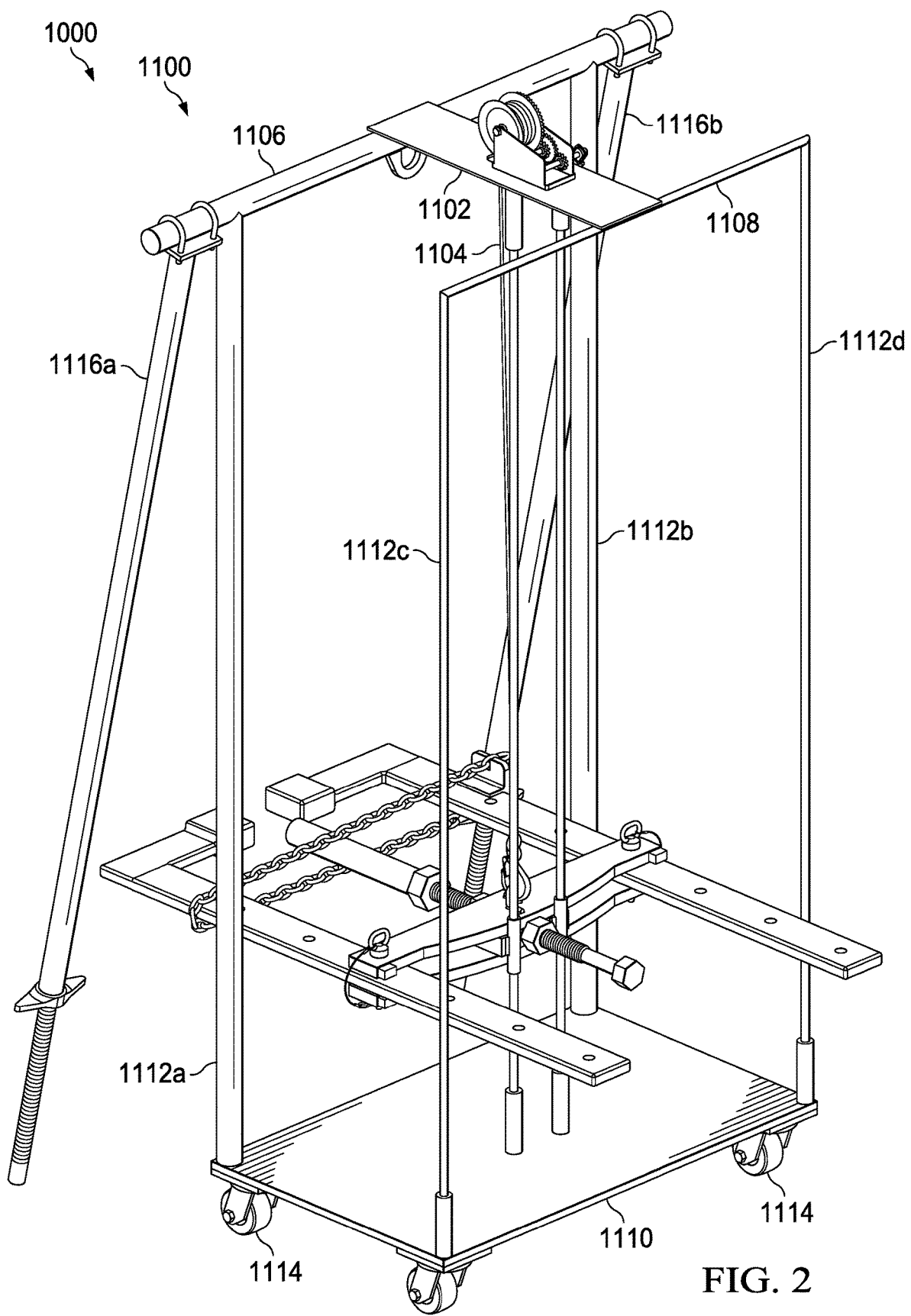
FIG. 2 is a perspective view of a support frame sub-assembly of the coupling hub pulling assembly of FIG. 1.

As further discussed below with respect to FIGS. 2 and 3, the support frame sub-assembly 1100 is coupled to the vertical adjustment sub-assembly 1200 to structurally support the puller sub-assembly 1300. The support sub-assembly interfaces with the ground by multiple vertical legs 1112. In the example shown in FIG. 1, multiple vertical legs 1112 has four legs, a first vertical leg 1112a, a second vertical leg 1112b, a third vertical leg 1112c, and a fourth vertical leg 1112d. The vertical leg 1112 can be of different shapes, for example, a tubular pipe, a solid rod, an L-shaped beam, or an I-beam. The vertical leg 1112 can be constructed of various materials, for example metal or wood. Vertical leg 1112 dimensions sufficient to support the coupling hub pulling assembly 1000 are 13 millimeter diameter and 1600 millimeter length steel pipe.

A top end of the first vertical leg 1112a and a top end of the second vertical leg 1112b are joined together by a first horizontal frame member 1106. A second horizontal frame member 1108 joins a top end of the third vertical leg 1112c and a top end of the fourth vertical leg 1112d together. The first horizontal frame member 1106 and the second horizontal frame member 1108 are joined together by a center member 1102. Support frame members can be joined together by various means, for example by welding or mechanical fasteners such as bolts, U-bolts, and nuts. The center member 1102 is connected to the vertical adjustment sub-assembly 1200 by a winch connection 1104 and a first vertical adjustment bar 1202a and a second vertical adjustment bar 1202b of the vertical adjustment sub-assembly 1200. In some implementations, the winch connection 1104 is a bracket, a plate, an eye mount, or a hook. In some implementations, multiple vertical legs 1112 are attached to and structurally supported by a base plate 1110. In some implementations, the base plate 1110 attached to and structurally supported by multiple wheels 1114. Multiple wheels enables the coupling hub pulling assembly 1000 to move in multiple directions on the ground. In some implementations, multiple wheels 1114 are locked to prevent movement during certain coupling hub separating operations. In some implementations, a first angular support leg 1116a and a second angular support leg 1116b connect to the first horizontal frame member 1106 to provide additional support. In some implementations, the angular support legs 1116 are adjustably and rotatably coupled to the first horizontal frame member 1106 to allow movement of the coupling hub pulling assembly 1000.

Figure 3:
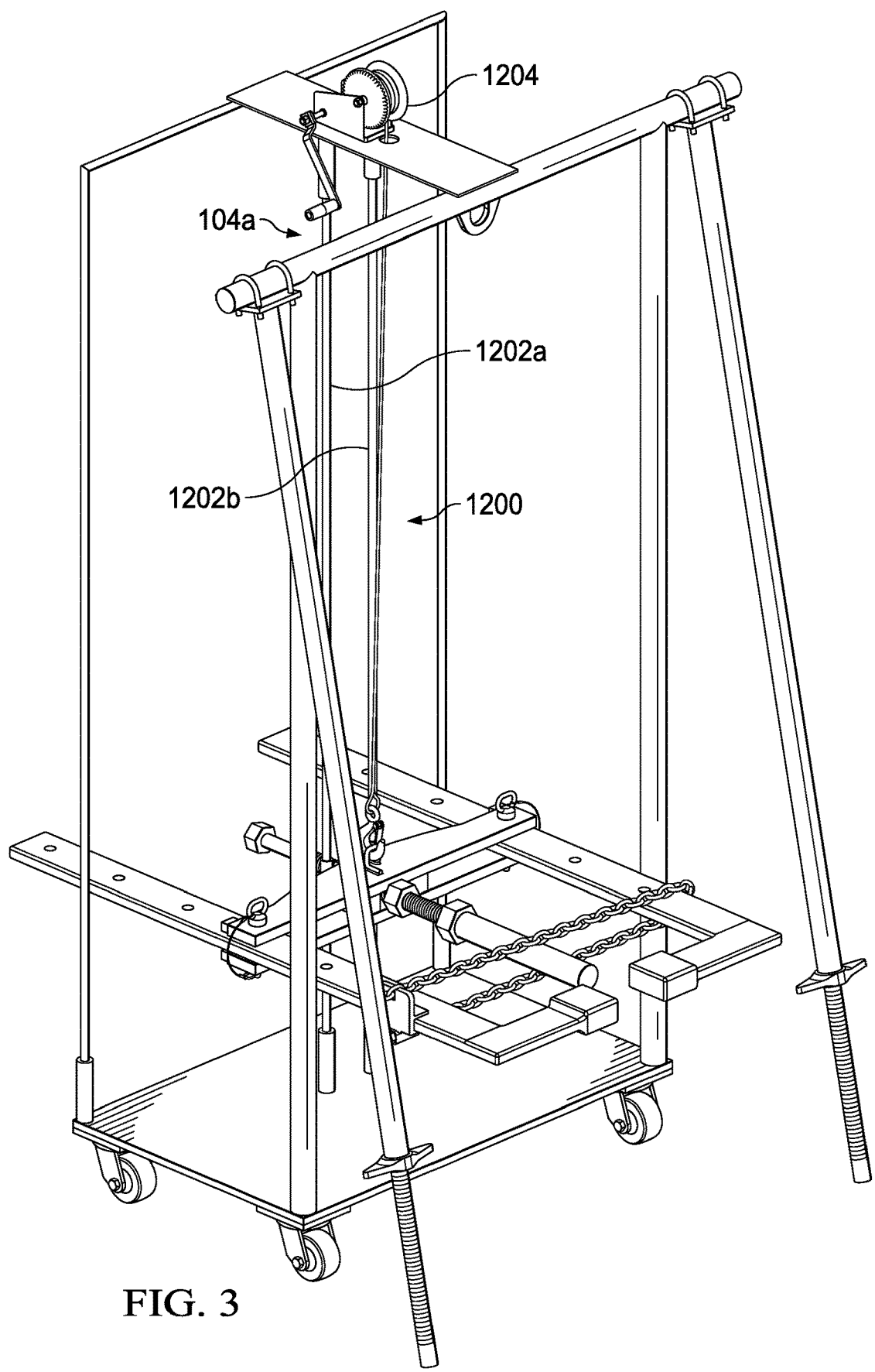
FIG. 3 is a perspective view of the vertical adjustment sub-assembly of the coupling hub pulling assembly of FIG. 1.

FIG. 3 shows a perspective view of the support frame sub-assembly 1100 connected to the vertical adjustment sub-assembly 1200. A winch 1204 of the vertical adjustment sub-assembly 1200 is connected to the winch connection 1104 of the support frame sub-assembly. The winch 1204 raises or lowers the vertical adjustment sub-assembly 1200 to a desired height corresponding to the shaft 204 and coupling hub 206. Once the desired height is reached, the winch 1204 is locked to prevent vertical movement of the puller sub-assembly 1300. The first vertical adjustment bar 1202a and a second vertical adjustment bar 1202b connect to the puller sub-assembly 1300 first vertical sleeve 1308a and second vertical sleeve 1308b to prevent lateral movement of the puller sub-assembly 1300.

Figure 4A:
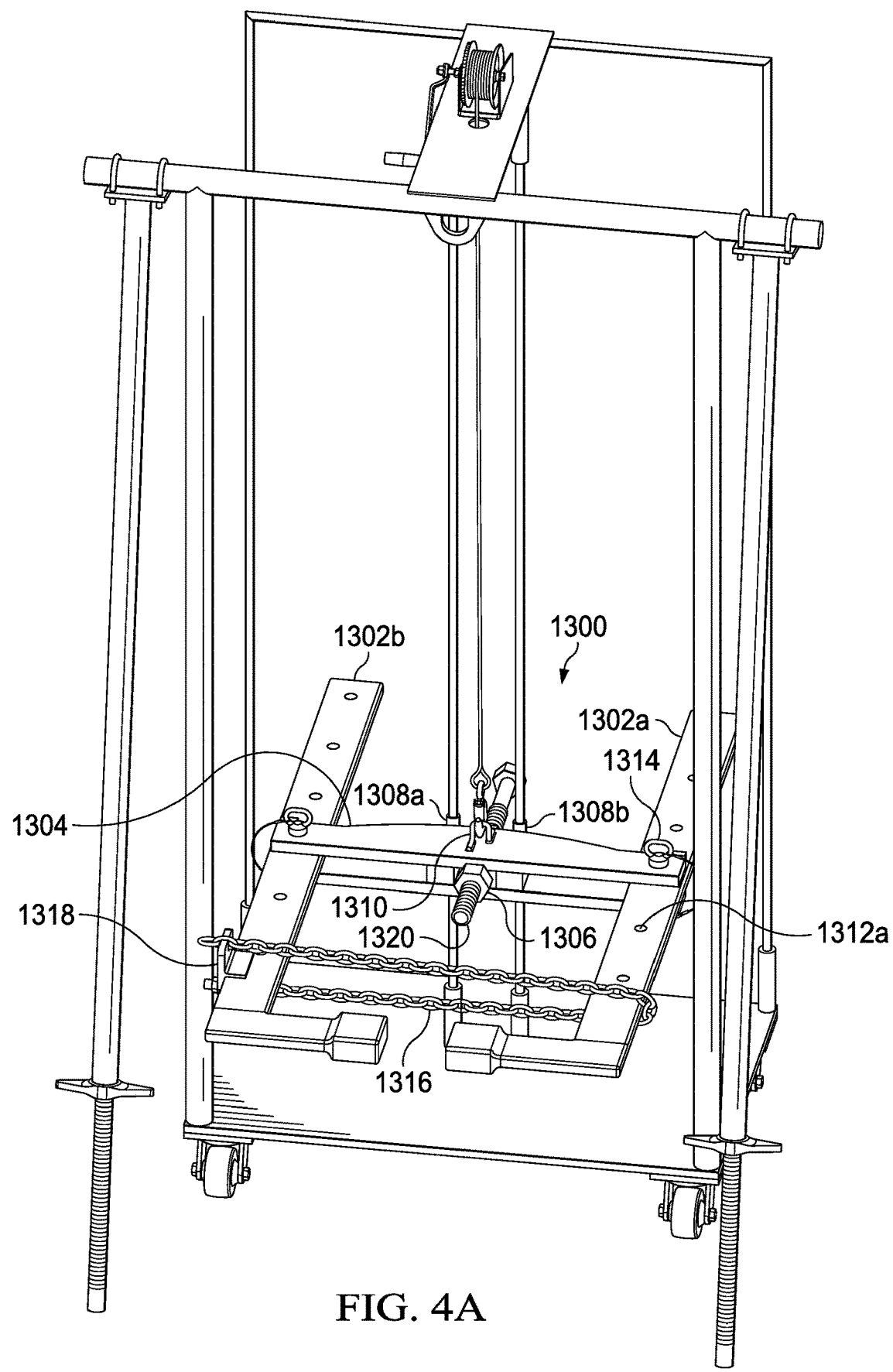
FIG. 4a is a perspective view of the puller sub-assembly of the coupling hub pulling assembly of FIG. 1.
Figure 4C:
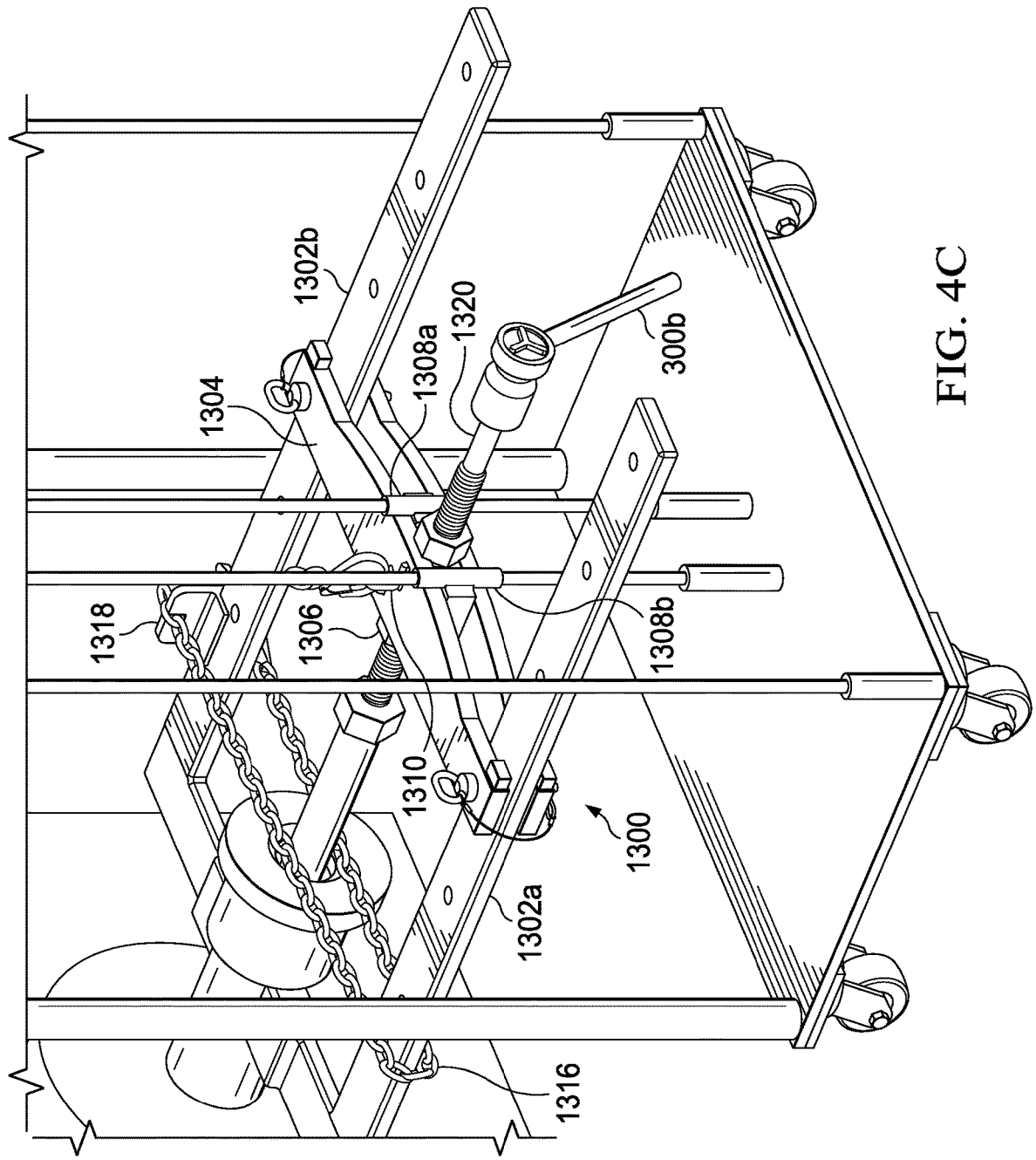
FIG. 4c is a perspective view of the puller sub-assembly of the coupling hub pulling assembly of FIG. 1.

FIGS. 4a, 4b and 4c show perspective views of the puller sub-assembly 1300. The puller sub-assembly includes a first puller arm 1302a, a second puller arm 1302b, a pusher stud 1320, and a puller bar 1304. The puller bar 1304 connects the first puller arm 1302a, the second puller arm 1302b, and the pusher stud 1320. The puller sub-assembly 1300 is connected to the vertical adjustment sub-assembly 1200 by the puller bar 1302. A puller bar winch ring 1310 on the puller bar 1302 connects to the winch 1204 of the vertical adjustment sub-assembly 1200. The puller bar 1302 further connects to the vertical adjustment sub-assembly 1200 first vertical adjustment bar 1202a by a first vertical sleeve 1308a and the second vertical adjustment bar 1202b by a second vertical sleeve 1308b. This connection constrains movement in the lateral direction and provides a guide path for the puller sub-assembly 1300 vertical movement. The puller bar 1302 is configured to accept a pusher stud 1320. The pusher stud 1320 couples to the shaft 204 and exerts a force on the shaft 204 when the pusher stud 1320 is operated. In some implementations, a hand tool 300 operates the pusher stud 1320. FIGS. 4b and 4c show some examples of hand tools used to operate the pusher stud 1320, including a combination wrench 300a (FIG. 4b) and a socket wrench 300b (FIG. 4c) that cause the pusher stud to rotate. In some implementations, the pusher stud 1320 is configured as a screw type device that is coupled to the puller bar by screw adjustment body 1306.

The first puller arm 1302a is configured with a first puller arm coupling hub holding end 1322a to engage the coupling hub 206. The second puller arm 1302b is configured with a second puller arm coupling hub holding end 1322b to engage the coupling hub 206 on the opposite side. In some implementations, the first puller arm 1302a or the second puller arm 1302b has a chain lock bracket 1318. A chain 1316 connects to the chain lock bracket to mechanically lock the first puller arm 1302a and the second puller arm 1302b to the coupling hub 206. The first puller arm 1302a and the second puller arm 1302b exert a force on the coupling hub 206 in the opposite direction of the force exerted on the shaft 204 by the pusher stud 1320. The application of forces in opposing directions causes the coupling hub 206 to move in an axis of the shaft 204 and separate from the shaft 204. In some implementations, the first puller arm 1302a has multiple puller arm adjustment pin holes 1312a that correspond to a puller bar pin hole 1324a that fit a puller adjustment lock pin 1314a to allow first puller arm 1302a adjustment in horizontal plane relative to the surface of the Earth to properly engage the coupling hub 206. The second puller arm 1302b has a second multiple puller arm adjustment pin holes 1312b that correspond to a puller bar pin hole 1324b that fit a puller adjustment lock pin 1314b to allow second puller arm 1302b adjustment in horizontal plane relative to the surface of the Earth to properly engage the coupling hub 206. In some implementations, the first puller arm 1302a and the second puller arm 1302b are coupled to the puller bar by other means, for example by welding or mechanical fasteners such as bolts, U-bolts, and nuts.

Figure 5:
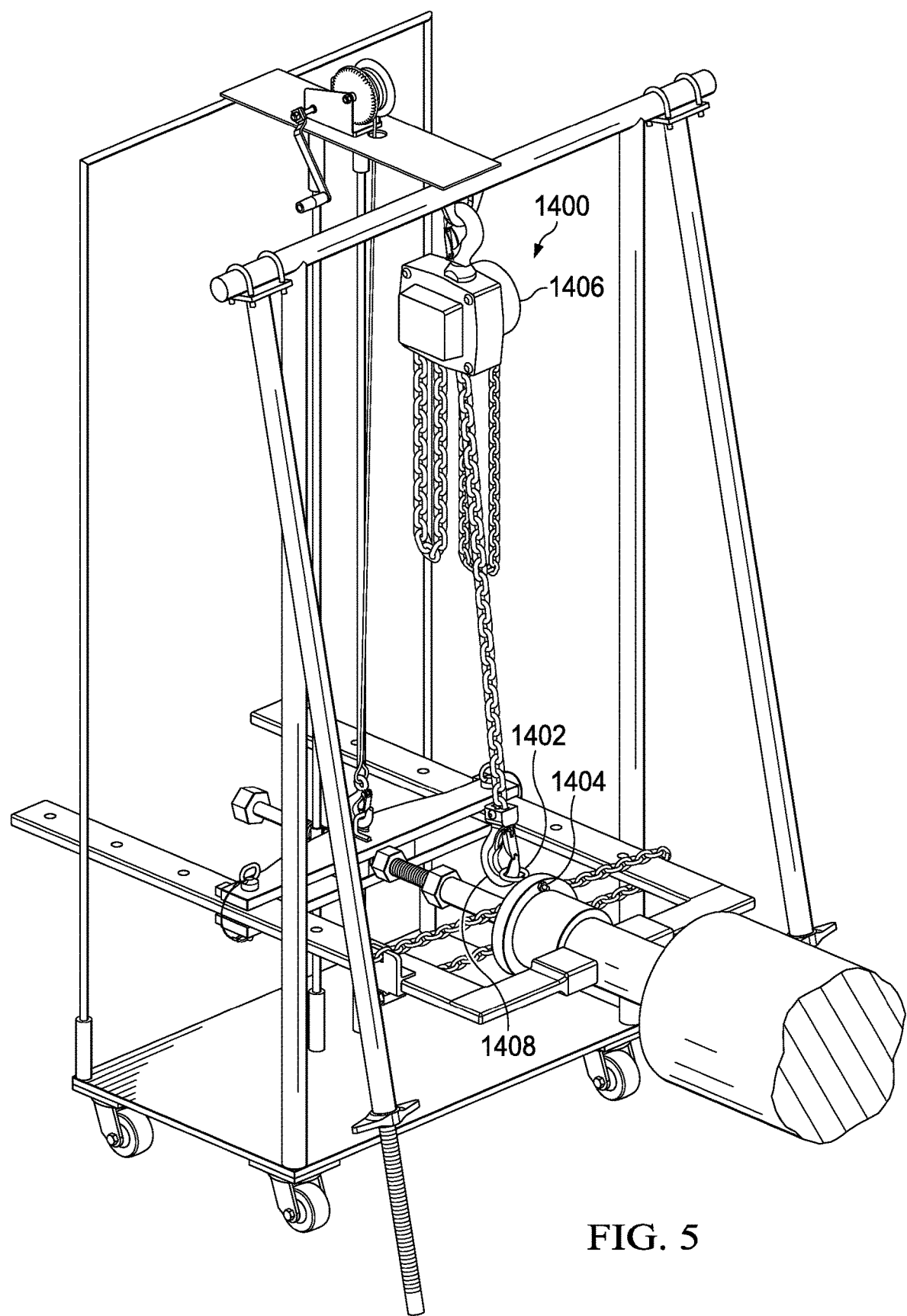
FIG. 5 is a perspective view of the coupling hub holding sub-assembly of the coupling hub pulling assembly of FIG. 1.
Figure 6:
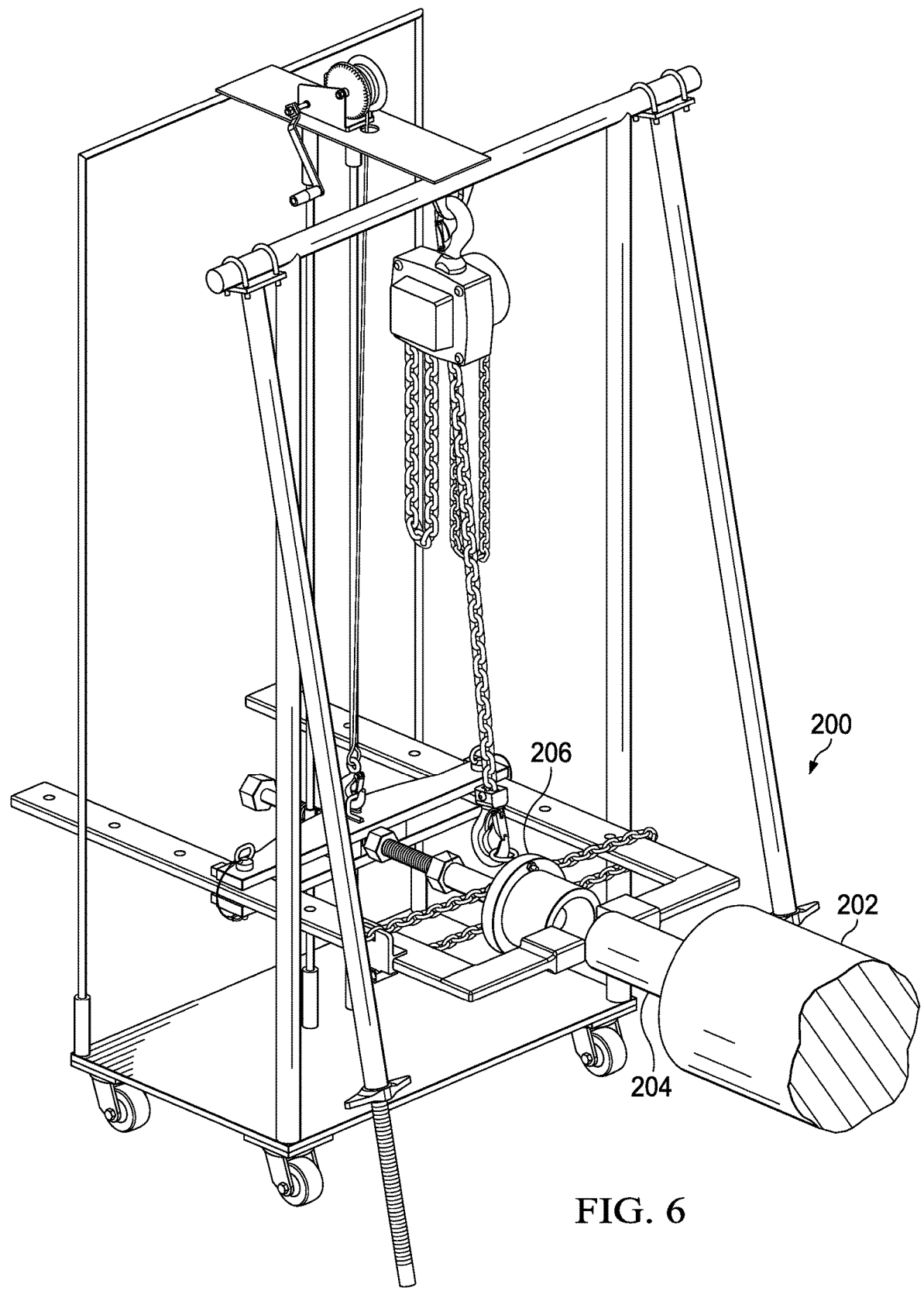
FIG. 6 is a perspective view of the coupling hub pulling assembly engaged with a coupling hub on a motor shaft.

FIG. 5 and FIG. 6 show the coupling hub holding sub-assembly 1400 connected to the support frame sub-assembly 1100 to support the coupling hub 206 after the coupling hub 206 and the shaft 204 separate. FIG. 6 is a perspective view of the coupling hub pulling assembly 1000 engaged with a coupling hub 206 on a motor shaft 204. An eye bolt 1402 is attached to the coupling hub 206 using an eye bolt nut 1404. A chain hoist 1406 is connected to the support frame sub-assembly 1100. The chain hoist 1406 has a chain hoist hook 1408 that is connected to the eye bolt 1402. After the coupling hub 206 is separated from the shaft 204, the chain hoist 1406 is operated to support, raise and lower the coupling hub 206.

Figure 7:
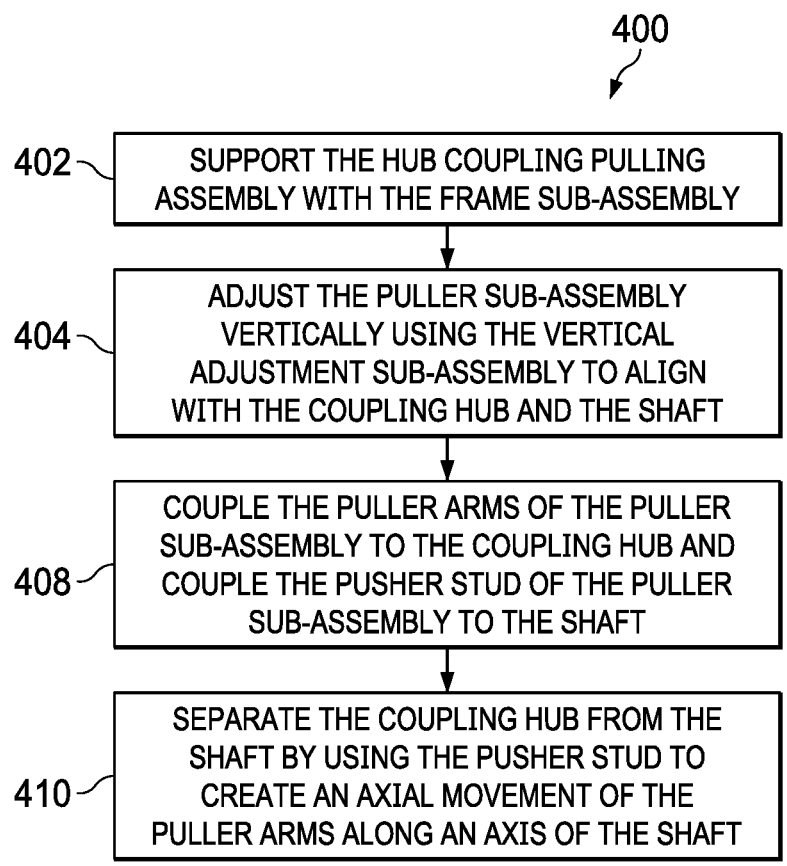
FIG. 7 is a flow chart of an example method of removing a coupling hub from a shaft according to implementations of the present disclosure.

FIG. 7 is a flow chart of an example method 400 of removing a coupling hub from a shaft according to implementations of the present disclosure. This method includes structurally supporting a hub coupling pulling assembly with a support frame sub-assembly configured to separate a coupling hub from a shaft (402). The method also includes adjusting, by a vertical adjustment sub-assembly mechanically coupled to the support frame sub-assembly and vertically relative to a surface of the Earth, a puller sub-assembly relative to the coupling hub (402). This method also includes coupling, by the puller sub-assembly, multiple puller arms of the puller sub-assembly to the coupling hub and a pusher stud of the puller sub-assembly to the shaft (404). This method also includes separating, by the puller sub-assembly, the coupling hub from the shaft by an axial movement of the puller arms along an axis of the shaft (406).

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations. For example, the implementations are described with reference to a coupling hub.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, or to about another particular value or a combination of them. When such a range is expressed, it is to be understood that another implementation is from the one particular value or to the other particular value, along with all combinations within said range or a combination of them.

Throughout this application, where patents or publications are referenced, the disclosures of these references in their entireties are intended to be incorporated by reference into this application, in order to more fully describe the state of the art to which the disclosure pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an assembly. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

The invention claimed is:

1. A hub pulling assembly configured to separate a coupling hub coupled to a shaft of a rotating machine, the assembly comprising:
   a support frame sub-assembly configured to structurally support the hub pulling assembly and the coupling hub;
   a puller sub-assembly configured to couple to the coupling hub and to separate the coupling hub from the shaft, the puller sub-assembly comprising:
      a first puller arm comprising a first puller arm coupling hub holding end configured to mechanically engage a coupling hub first side, and a chain lock bracket;
      a second puller arm comprising a second puller arm coupling hub holding end mechanically arranged to engage a coupling hub second side, wherein the coupling hub second side opposes the coupling hub first side;
      a puller bar mechanically coupled to the first puller arm and the second puller arm, the puller bar comprising a screw adjustment body;
      a pusher stud configured to rotatably couple with the puller bar screw adjustment body, a pusher stud first end configured to mechanically couple with the shaft attached to the coupling hub, and a pusher stud second end configured to accept a hand tool; and
      a chain mechanically coupled to the chain lock bracket, wherein the chain mechanically locks the first puller arm and the second puller arm to the coupling hub; and
   a vertical adjustment sub-assembly mechanically coupled to the puller sub-assembly, the vertical adjustment sub-assembly structurally supported by the support frame sub-assembly, the vertical adjustment sub-assembly configured to adjust an elevation of the puller sub-assembly from a surface of the Earth.

2. The hub pulling assembly of claim 1, wherein the puller sub-assembly is configured to cause the coupling hub to move along an axis of the shaft.

3. The hub pulling assembly of claim 1, wherein the vertical adjustment sub-assembly further comprises:
   a plurality of vertical adjustment bars, a vertical adjustment bar movably coupled to the puller sub-assembly, the puller sub-assembly constrained to move in a vertical axis by a vertical bar; and
   a winch mechanically coupled to the support frame sub-assembly and the puller sub-assembly, the winch configured to move the puller sub-assembly in a vertical direction.

4. The hub pulling assembly of claim 1, wherein the support frame further comprises:
- a base plate configured to support the hub pulling assembly;
- a plurality of vertical legs attached to the base plate;
- a center frame member, the center member having a center member first end and a center member second end, the center member configured to accept a winch;
- a first frame member coupled perpendicular to the center frame member first end, the first frame member also coupled to a first subset of the vertical legs; and
- a second frame member coupled perpendicular to the center frame member second end in a same plane as the first frame member, the second frame member also coupled to a second subset of the vertical legs.

5. The hub pulling assembly of claim 1, the support frame further comprises an angular support leg mechanically coupled to a front side of the support frame sub-assembly, the angular support leg configured to prevent support frame movement to the front side.

6. The hub pulling assembly of claim 1, further comprising a coupling hub holding sub-assembly configured to hold the coupling hub once separated from the shaft comprising:
- a chain hoist or a lever hoist mechanically coupled to the support frame sub-assembly; and
- an eye bolt mechanically coupled to the coupling hub, the chain hoist mechanically coupled to the eye bolt.

7. A method comprising:
- structurally supporting, by a support frame sub-assembly, an assembly configured to separate a coupling hub from a shaft;
- adjusting, by a vertical adjustment sub-assembly mechanically coupled to the support frame and vertically relative to a surface of the Earth, a puller sub-assembly relative to the coupling hub, the puller sub-assembly mechanically coupled to the support frame sub-assembly;
- coupling, by the puller sub-assembly, a plurality of puller arms of the puller sub-assembly to the coupling hub and a pusher stud of the puller sub-assembly to the shaft, wherein coupling, by the puller sub-assembly, a plurality of puller arms of the puller sub-assembly to the coupling hub and a pusher stud of the puller sub-assembly to the shaft comprises:
  - coupling a first puller arm coupling hub holding end to a coupling hub first side;
  - coupling a second puller arm coupling hub holding end to a coupling hub second side, wherein the coupling hub second side opposes the coupling hub first side;
  - locking a chain around the first puller arm coupling hub holding end and the second puller arm coupling hub holding end; and
  - seating the pusher stud against the shaft; and
- separating, by the puller sub-assembly, the coupling hub from the shaft by an axial movement of the plurality of puller arms along an axis of the shaft by rotating the pusher stud with a hand tool causing the coupling hub to move along an axis of the shaft.

8. The method of claim 7, wherein vertically adjusting the puller sub-assembly further comprises:
- operating a winch attached to the support frame sub-assembly to vertically adjust the puller sub-assembly.

9. The method of claim 7, further supporting the coupling hub assembly by engaging an angular support leg mechanically coupled to a front side of the support frame sub-assembly.

10. The method of claim 7, further comprising supporting the coupling hub by a chain hoist or a lever hoist attached to an eye bolt on the coupling hub.

11. A hub pulling assembly configured to separate a coupling hub coupled to a shaft of a rotating machine, the assembly comprising:
- a support frame sub-assembly configured to structurally support the hub pulling assembly and the coupling hub, the support frame sub-assembly further comprising a plurality of vertical legs, a center frame member configured to accept a winch, a first frame member coupled perpendicular to the center frame member and also coupled to a first subset of the vertical legs, a second frame member coupled perpendicular to the center frame member in a same plane as the first frame member and also coupled to a second subset of the vertical legs;
- a puller sub-assembly configured to couple to the coupling hub and to separate the coupling hub from the shaft, the puller sub-assembly further comprising a first puller arm comprising a first puller arm coupling hub holding end configured to mechanically engage the coupling hub first side, a second puller arm comprising a second puller arm coupling hub holding end mechanically arranged to engage a coupling hub second side, a puller bar mechanically coupled to the first puller arm, the second puller arm, and the vertical adjustment sub-assembly, and a pusher stud mechanically coupled to the puller bar, and a puller arm lock; and
- a vertical adjustment sub-assembly mechanically coupled to the puller sub-assembly, the vertical adjustment sub-assembly structurally supported by the support frame sub-assembly, the vertical adjustment sub-assembly configured to adjust an elevation of the puller sub-assembly from a surface of the Earth, the puller sub-assembly constrained to move in a vertical axis.

12. The hub pulling assembly of claim 11, wherein the puller sub-assembly is configured to cause the coupling hub to move along an axis of the shaft.

13. The hub pulling assembly of claim 11, the support frame further comprises an angular support leg mechanically coupled to a front side of the support frame sub-assembly, the angular support leg configured to prevent support frame movement to the front side.

14. The hub pulling assembly of claim 11, further comprising a coupling hub holding sub-assembly configured to hold the coupling hub once separated from the shaft comprising:
- a chain hoist or a lever hoist mechanically coupled to the support frame sub-assembly; and
- an eye bolt mechanically coupled to the coupling hub, the chain hoist mechanically coupled to the eye bolt.

* * * * *